Figure 1:
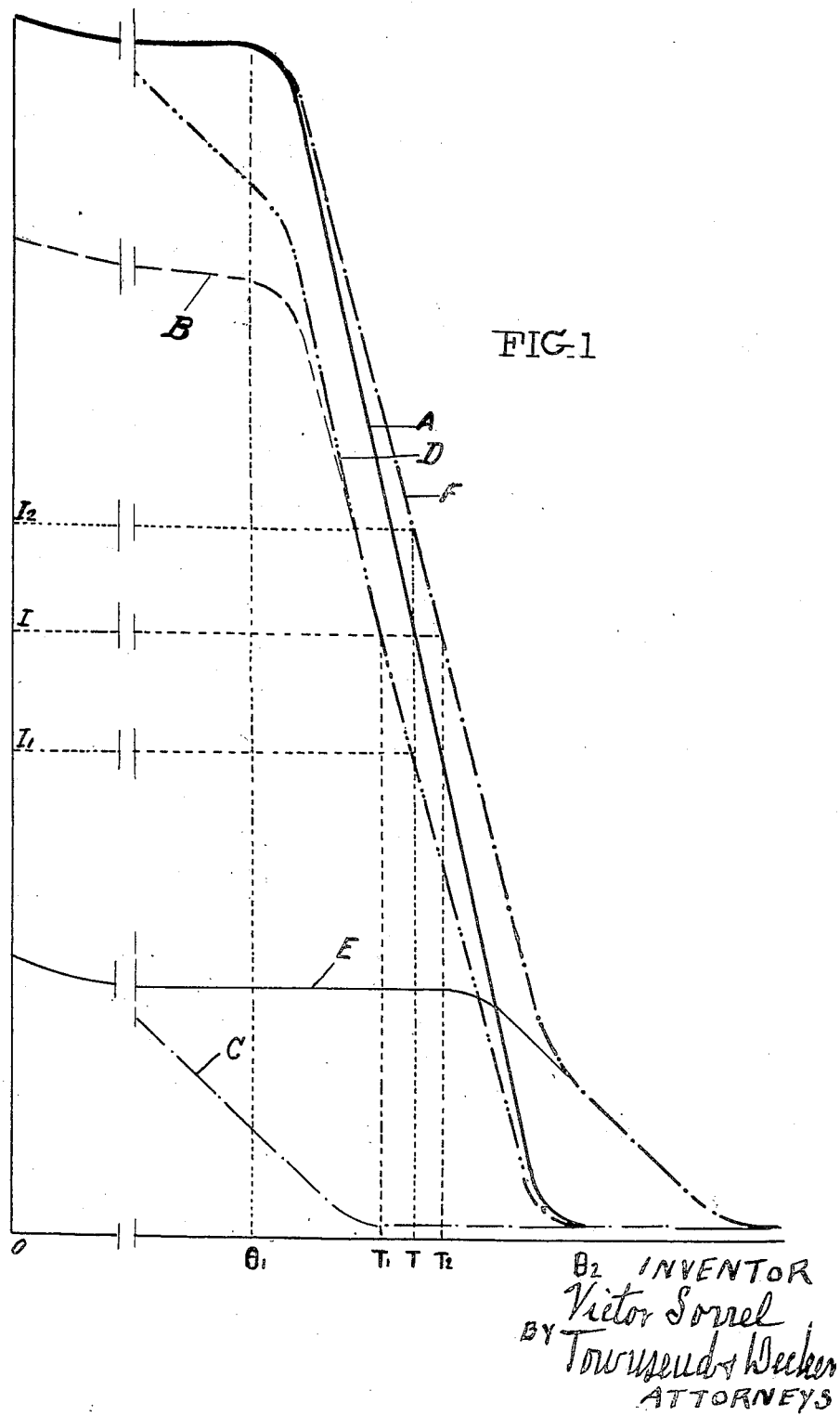

Oct. 2, 1934.                    V. SORREL                    1,975,438
           MAGNETIC MUFFLE OR OTHER BODY AND METHOD OF VARYING
                    THE MAGNETIC TRANSFORMATION THEREOF
                          Filed July 23, 1932           2 Sheets-Sheet 2

INVENTOR
By Victor Sorrel
Townsend + Decker
ATTORNEYS.

Patented Oct. 2, 1934

1,975,438

UNITED STATES PATENT OFFICE 1,975,438

MAGNETIC MUFFLE OR OTHER BODY AND METHOD OF VARYING THE MAGNETIC TRANSFORMATION THEREOF

Victor Sorrel, Grenoble, France, assignor to Ugine-Infra, Grenoble, France, a corporation of France Application July 23, 1932, Serial No. 624,334
In France September 9, 1931

6 Claims. (Cl. 219—13)

It is known that when a body of metal or metallic alloy is placed in an inducting magnetic field of a definite value, its inductance varies very rapidly as a function of the temperature in the neighbourhood of the point of magnetic transformation of this body or Curie point. Between the temperatures of beginning and completion of the magnetic transformation of the body considered, to each temperature corresponds a very definite value and only one value of the inductance of this body. Conversely, to each value of the inductance of the body corresponds a single temperature.

This relation between the inductance of a magnetic body and the temperature it reaches, under the influence of the magnetic field in which it is placed has already been employed hitherto in order to determine the temperature of a magnetic body by the measurement of its inductance. Thus, temperature regulators or indicators have been based on the variation of the inductance of a magnetic body as a function of its temperature of heating in the neighbourhood of the Curie point.

This same relation has likewise been utilized for the auto-regulation of temperature in the interior of a magnetic muffle of a furnace heated by induction (see copending applications, Ser. No. 477,172 for Method of heating by induction and furnace therefor, filed August 22, 1930, and Ser. No. 581,108, for Induction-heated furnace, filed Dec. 15, 1931).

But it is easily seen that, on account of this very definite relation existing between the temperatures and the values of the inductance in the neighbourhood of the Curie point, when once for all the magnetic detection of a temperature has been regulated by means of a given value of the inductance of a magnetic body, it is necessary, in the case of an apparatus with constant magnetic field and if it is desired to utilize the same apparatus to detect different values of the temperature, to change the magnetic body each time. In particular, in induction furnaces in which the temperature is regulated by an auto-regulating muffle, it is necessary to change the muffle every time it is desired to obtain a different temperature of running.

It is the object of the present invention to avoid this inconvenience and to provide in the neighbourhood of the Curie point various temperatures for a single value of the inductance of a definite magnetic body placed in a constant magnetic inducting field. In accordance with this invention for this purpose the whole or part of the magnetic body in question is constituted by means of movable elements, capable of being withdrawn separately and replaced by similar elements constituted of a magnetic metal or alloy having a different point of magnetic transformation.

The inductance of the assembly of the movable elements, or fixed and movable elements, constituting the magnetic body considered, is then equal at any moment to the sum of the inductances of its constituent elements, and, knowing the curve of the inductance as a function of the temperature for each of these elements constituting the magnetic body, it is a simple matter to determine the total inductance of the body.

It is obviously possible by means of this arrangement to vary in the neighbourhood of the Curie point, the value of the inductance of a magnetic body considered for a constant temperature.

Figure 2:
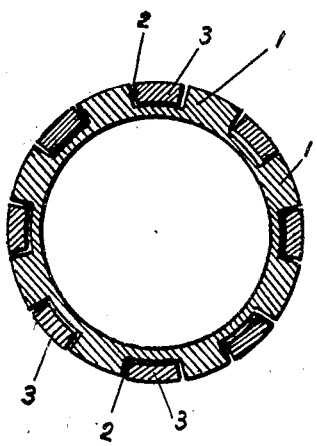

In the accompanying drawings, Fig. 1 is a diagram indicating inductance curves of a given body of magnetic metal; Fig. 2 is a cross-section and Fig. 3 a side elevation of one form of furnace muffle; and Fig. 4 is a cross-section and Fig. 5 a side elevation of another form of furnace muffle embodying the invention.

In Figure 1 the curve A represents the curve of the inductance as a function of the temperature of a given body of magnetic metal or alloy. The values of the inductance are given as ordinates and the temperatures as abscissæ. For this body the temperatures $\theta_1$ and $\theta_2$ represent the temperatures of beginning and completion of the magnetic transformation. Between these two temperatures to each value of the inductance corresponds, as can easily be seen, a single temperature if the magnetic field in which the body is placed is constant.

If now a part of the body considered is replaced by a magnetic element the temperature of transformation of which is lower, for example, although not very different, a body will be produced composed of two different magnetic elements, and the inductance curves of these two elements constituting the body in question are illustrated by B and C. The new inductance curve of the body thus constituted will then be the curve D, obtained by calculating the sum of the ordinates of the curves B and C.

If, on the contrary, this same part of the magnetic body considered is replaced by a magnetic element, whose temperatures of transformation are higher, there will be for each of the elements constituting the whole the inductance curves B and E, and the curve F obtained by summing the ordinates of these two curves will represent the inductance as a function of the temperature in the new magnetic body.

For a single value I of the inductance corresponding to the temperature T in the original body (curve A), there will thus be temperatures respectively equal to $T_1$ and $T_1$ depending on the value of the original inductance, that is to say, on the inducting field, on the quantities and the temperatures of transformation of the substituted elements.

Conversely, for a single value T of the temperature corresponding to an inductance I in the original body (curve A), there will be inductances respectively equal to $I_1$ and $I_2$ (curves D and F) depending on the value of the original temperature, and the quantities and temperatures of transformation of the substituted elements.

This process can be applied in particular to auto-regulating temperature magnetic muffles for induction furnaces.

It is known that with a muffle of given magnetic material it was necessary hitherto, in order to modify the temperature of auto-regulation within the limits of the temperatures of magnetic transformation, to modify the value of the inductance of the muffle, either by varying the inducting field (which caused a corresponding variation in the power applied to the furnace), or by varying the dimensions of the muffle (which caused a variation in the yield).

In order to obtain, in accordance with the present invention, a different temperature of auto-regulation, it is sufficient, given a furnace the characteristics of which are previously determined, to constitute a part of the original muffle by means of movable elements capable of being easily replaced by similar elements of magnetic material of higher or lower point of transformation than that of the original muffle. To one value of the inductance will then correspond different temperatures of auto-regulation higher or lower than the temperature of auto-regulation of the original muffle.

Figure 3:
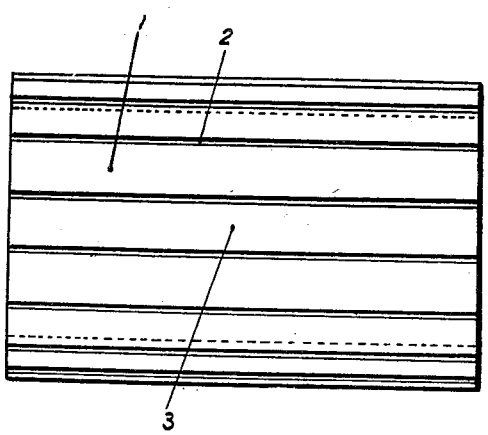
Figure 4:
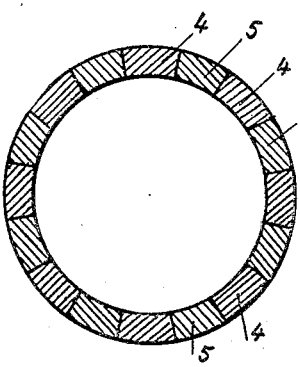
Figure 5:
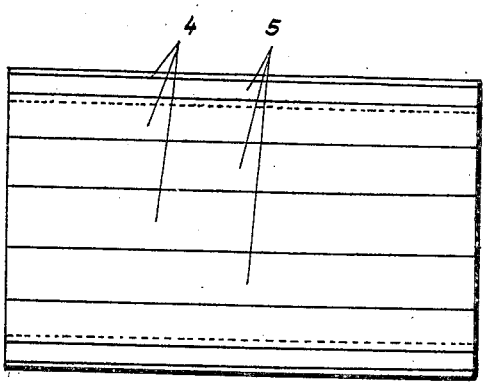

As shown in Figures 2 to 5 of the accompanying drawings are illustrated by way of example, in no way limiting, two embodiments of furnace muffles in accordance with the invention, Figures 2 and 4 being in transverse section and Figures 3 and 5 in elevation.

In Figures 2 and 3, in order to produce a continuous muffle without destroying the internal continuity, there are provided on the periphery of the muffle 1 recesses 2, in which are inserted bars 3 of magnetic metal having each a fixed point of transformation.

In the case in which the muffle can, without inconvenience, comprise longitudinal slots, it may be constructed (Figures 4 and 5) of an assembly of juxtaposed removable bars 4 and 5, these bars being constituted either all of the same magnetic metal or alloy or in part of metals or alloys of higher or lower point of transformation, according as it is desired to increase or diminish the temperature of auto-regulation of the muffle.

What I claim is:

1. An auto-regulating temperature magnetic apparatus comprising a body having a given point of magnetic transformation and elements which are severally removable and replaceable having each a fixed point of magnetic transformation, the transformation point of each removable element being different from that of at least one of the others.

2. An auto-regulating temperature magnetic muffle for an induction furnace comprising a body having a given point of magnetic transformation and elements which are severally removable and replaceable having each a fixed point of magnetic transformation, the transformation point of each removable element being different from that of at least one of the others.

3. Auto-regulating temperature magnetic muffle for induction furnaces, comprising recesses provided in said muffle, movable magnetic bars having a fixed point of magnetic transformation, adapted to be inserted in and withdrawn from said recesses.

4. Auto-regulating temperature magnetic muffle for induction furnaces, comprising longitudinal recesses provided in said muffle and movable magnetic bars having a fixed point of magnetic transformation, adapted to be inserted in and withdrawn from said recesses.

5. Auto-regulating temperature magnetic muffle for induction furnaces, comprising a muffle body having receiving seats, and transformation bars of magnetic metal removably engaging said seats.

6. Auto-regulating temperature magnetic muffle for induction furnaces, comprising a muffle body having seats therein, and transformation varying bars of magnetic metal having a fixed point of magnetic transformation different from that of the muffle body, removably engaging said seats and lying substantially within the plane of the muffle body.

VICTOR SORREL.